E. WAGNER.
MACHINE FOR COILING SPIRAL SPRINGS.
APPLICATION FILED APR. 23, 1913.

1,122,447.

Patented Dec. 29, 1914.
8 SHEETS—SHEET 1.

Fig. 1.

WITNESSES
Fred Pohl
John A. Kring

E. Wagner.
INVENTOR
By Grayden Mark
ATTORNEY

E. WAGNER.
MACHINE FOR COILING SPIRAL SPRINGS.
APPLICATION FILED APR. 23, 1913.

1,122,447.

Patented Dec. 29, 1914.
8 SHEETS—SHEET 3.

WITNESSES
Fred Pohl
John A. Percival

E. Wagner.
INVENTOR
BY Croydon Marks
ATTORNEY

E. WAGNER.
MACHINE FOR COILING SPIRAL SPRINGS.
APPLICATION FILED APR. 23, 1913.

1,122,447.

Patented Dec. 29, 1914.
8 SHEETS—SHEET 5.

WITNESSES
Fred Pohl.
John A. Percival.

E. Wagner.
INVENTOR
Croydon Marks
BY ATTORNEY

E. WAGNER.
MACHINE FOR COILING SPIRAL SPRINGS.
APPLICATION FILED APR. 23, 1913.

1,122,447.

Patented Dec. 29, 1914.

UNITED STATES PATENT OFFICE.

ERNST WAGNER, OF REUTLINGEN, GERMANY.

MACHINE FOR COILING SPIRAL SPRINGS.

1,122,447.  Specification of Letters Patent. Patented Dec. 29, 1914.

Application filed April 23, 1913. Serial No. 763,068.

*To all whom it may concern:*

Be it known that I, ERNST WAGNER, a subject of the German Emperor, and residing at Reutlingen, Wurttemberg, Germany, have invented certain new and useful Improvements in Machines for Coiling Spiral Springs, of which the following is a specification.

This invention relates to an improved machine for manufacturing in various lengths and with various diameters, helical springs, either "closed" springs (tension springs), "open" springs (compression springs) or open springs with closed end convolutions.

The most important feature of the invention is this, that a shaft connected to a driving pulley by means of a one-revolution clutch controls, by means of cams, a severing device, a pitch forming member, a wire feeder and a clutch connecting a regulating shaft to a constantly revolving shaft, in such manner, that during the severing of the wire the wire feeder is inactive and the regulating device is disconnected from its drive. The engagement of the said one-revolution clutch is effected by the action of a tooth carried by the regulating shaft, which tooth may be adjusted for different numbers of convolutions of the springs to be manufactured. The regulating shaft, when disconnected from its drive returns instantly into its initial position, so as to be ready for regulating the subsequent working cycle.

One form of the improved machine constructed in accordance with this invention is shown by way of example in the accompanying drawings, in which:—

Figure 1:
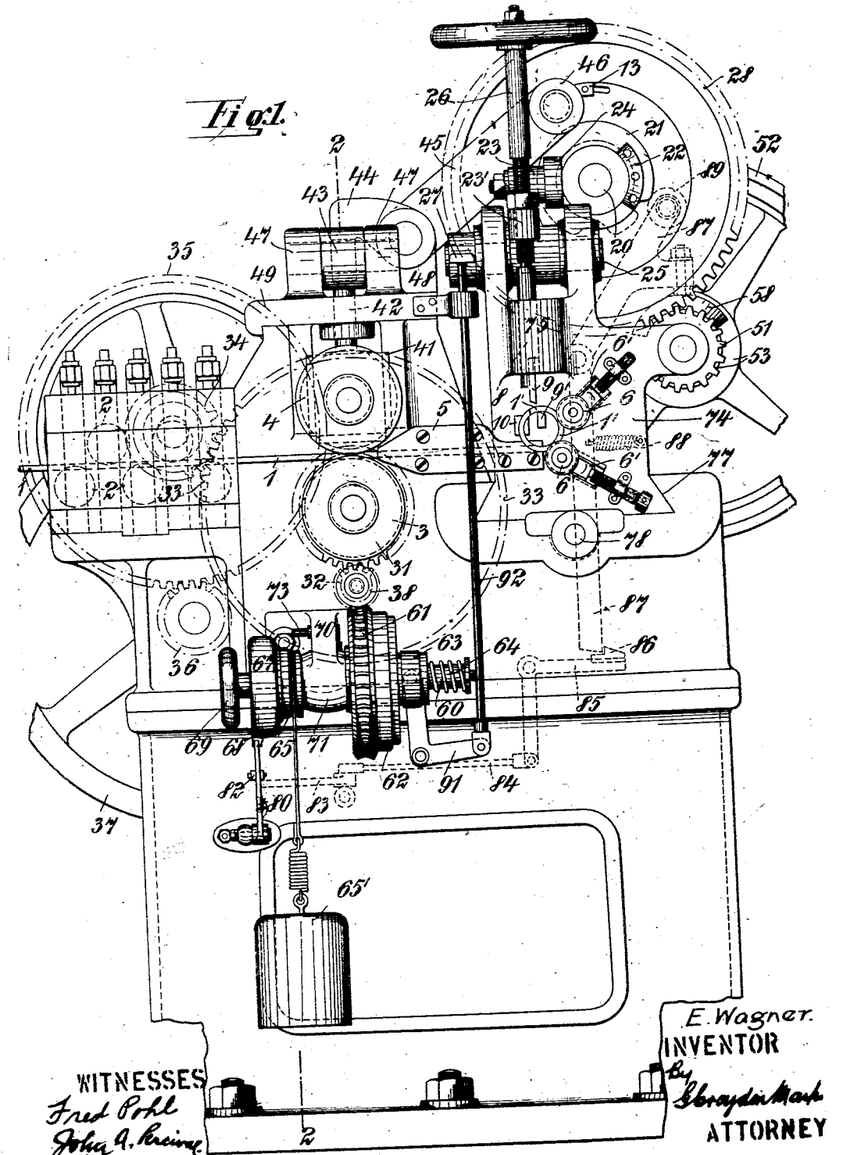
Figure 1 is a front elevation of the machine.
Figure 2:
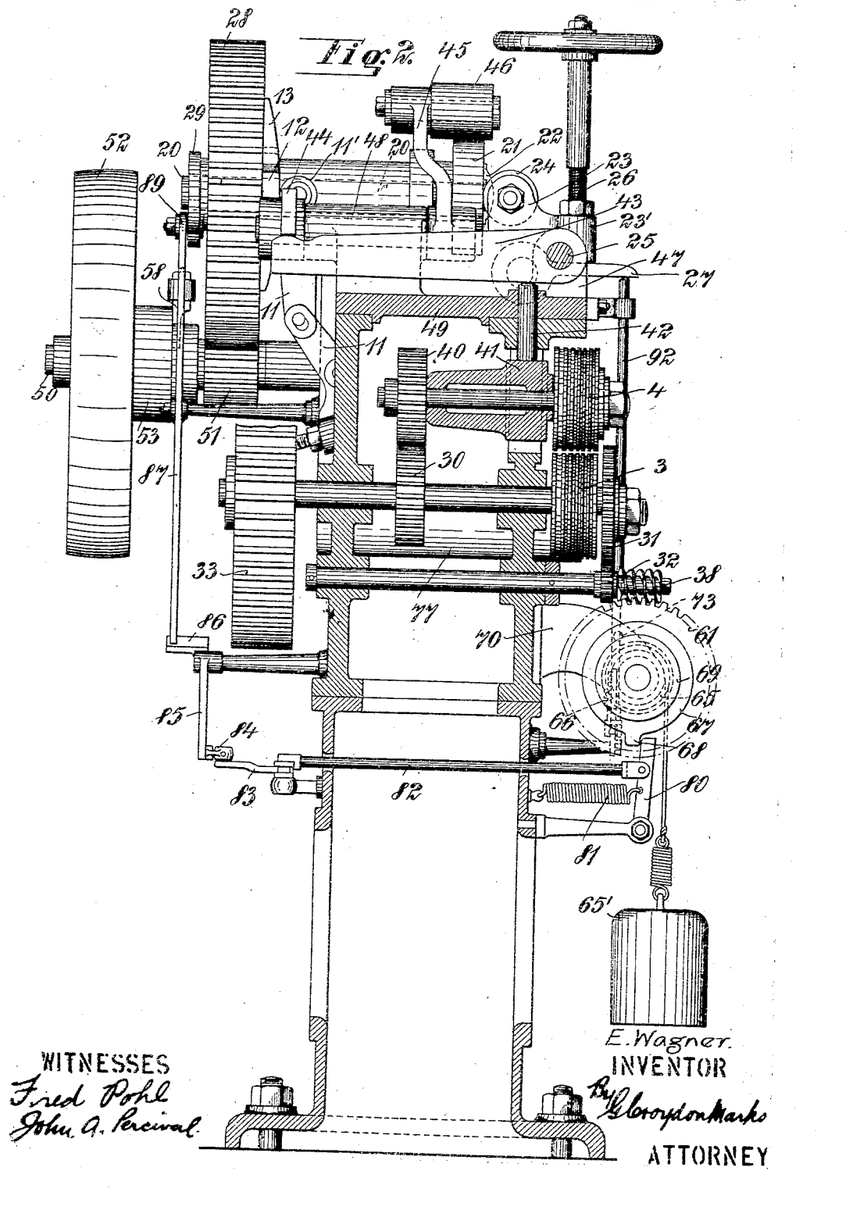
Fig. 2 is a vertical section on the line 2—2 of Fig. 1.
Figure 3:
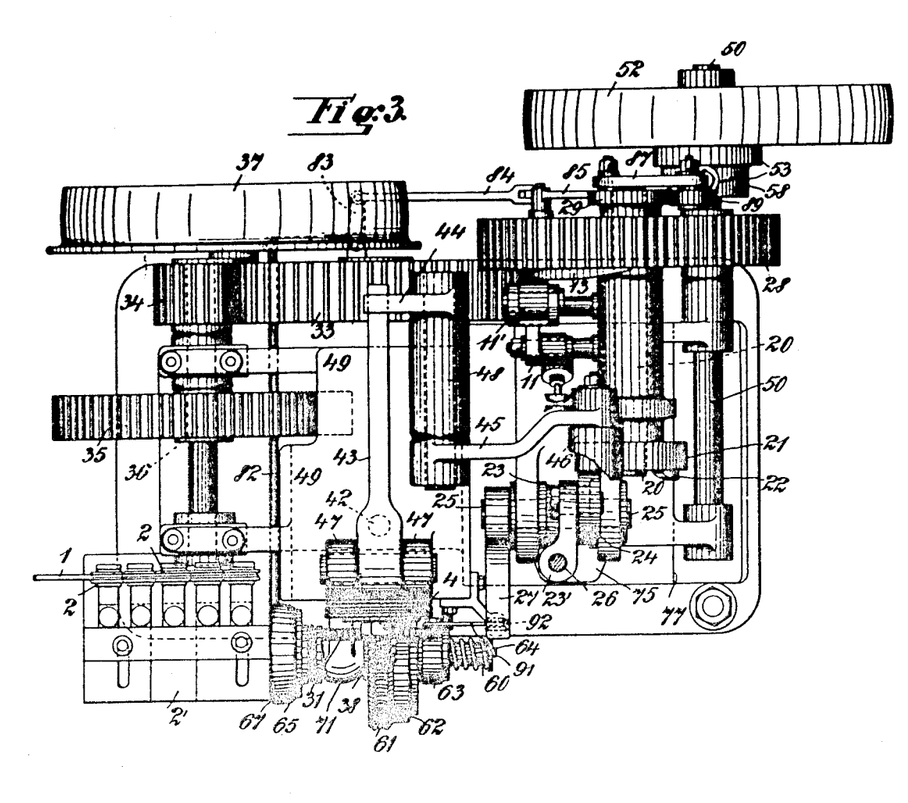
Fig. 3 is a plan.
Figures 4, 8:
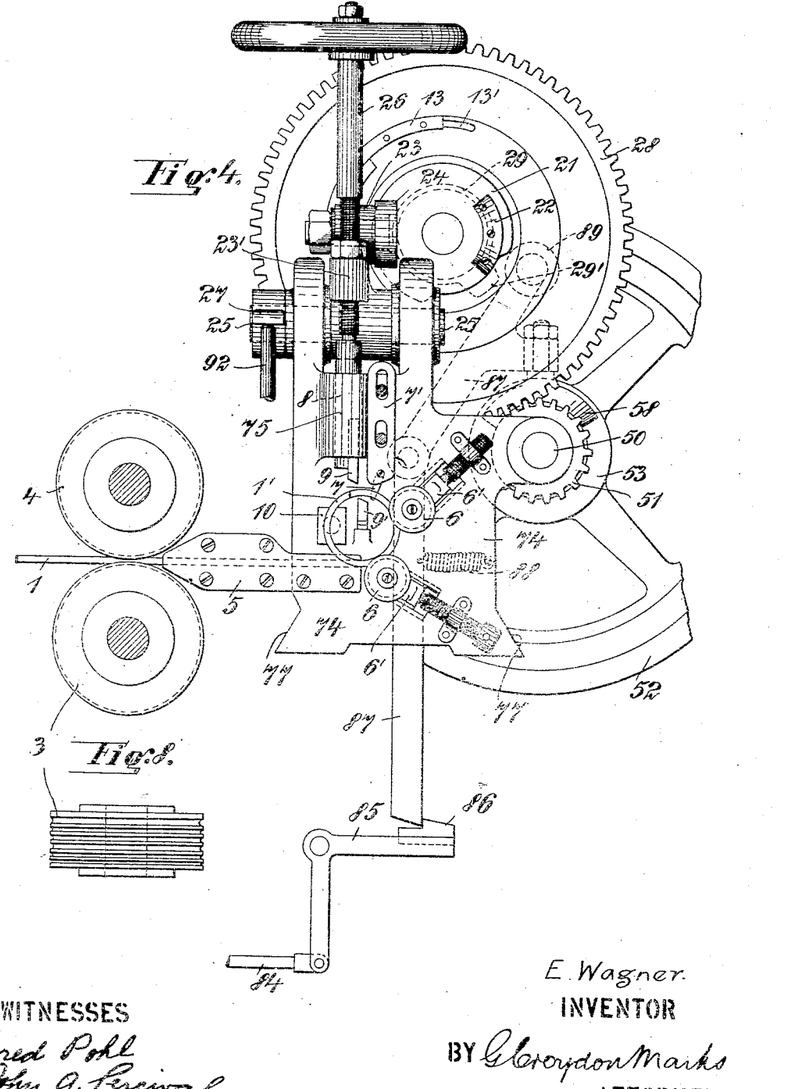
Fig. 4 is a front elevation drawn to an enlarged scale of the apparatus for coiling, altering the pitch of the spiral, stopping the feed of the wire and cutting the wire, said apparatus being adjustable on the machine frame forward and backward by means of a slideway (see 77 in Fig. 1).
Figs. 8 to 14 are views of details.

In the improved machine the wire 1 (Figs. 1 and 4) passes through the rolls 2, which are adjustably mounted in a known manner, and which serve for straightening the wire, between the feed rolls 3 and 4. The shaft of the lower of these rolls, *i. e.* 3, is driven slowly by means of toothed gearing 36/35, 34/33 from the driving pulley 37, and drives in its turn by means of toothed wheels 30/40 (Fig. 2) the upper feed roll 4, and by means of toothed wheels 31/32 the worm 38, which gears with the worm wheel 61 of the regulating device (Figs. 6 and 7). In front of the feed rolls 3 and 4, the wire passes into the groove of a guide plate 5 (Figs. 1 and 4) by which it is guided on to the periphery of the first of the two deflecting rolls 6 which are adjustably mounted by means of slides 6' and spindles, so as to render possible the manufacture of springs of different diameters. The deflecting rolls bend the wire in a circular form in the usual manner (see 1' Fig. 4). Above the adjustable finger 7 which is carried by the rail 7' (Figs. 4 and 5) and by means of which finger a striking of the front end of the wire against the guide plate 5 is prevented when coiling so-coiled closed springs, the wire passes farther between the cutting knives 9, 9' of the cutting-off device. In the guide rolls 3 and 4 in the illustrated example, a number of grooves are produced by turning which serve for accommodating different thicknesses of wire. The sliding movement of the whole apparatus shown in Figs. 4 and 5 in its guideway 7( produced by means of the spindle 78 (Fig. 1), serves to bring the guide plate 5 together with the deflecting rolls 6 in a line with those grooves of the pair of rolls which are to be used for the particular work in hand. The straightening rolls 2 can also be moved into line with the different grooves by the displacement of the frame 2' (see Fig. 3).

Figures 5, 9:
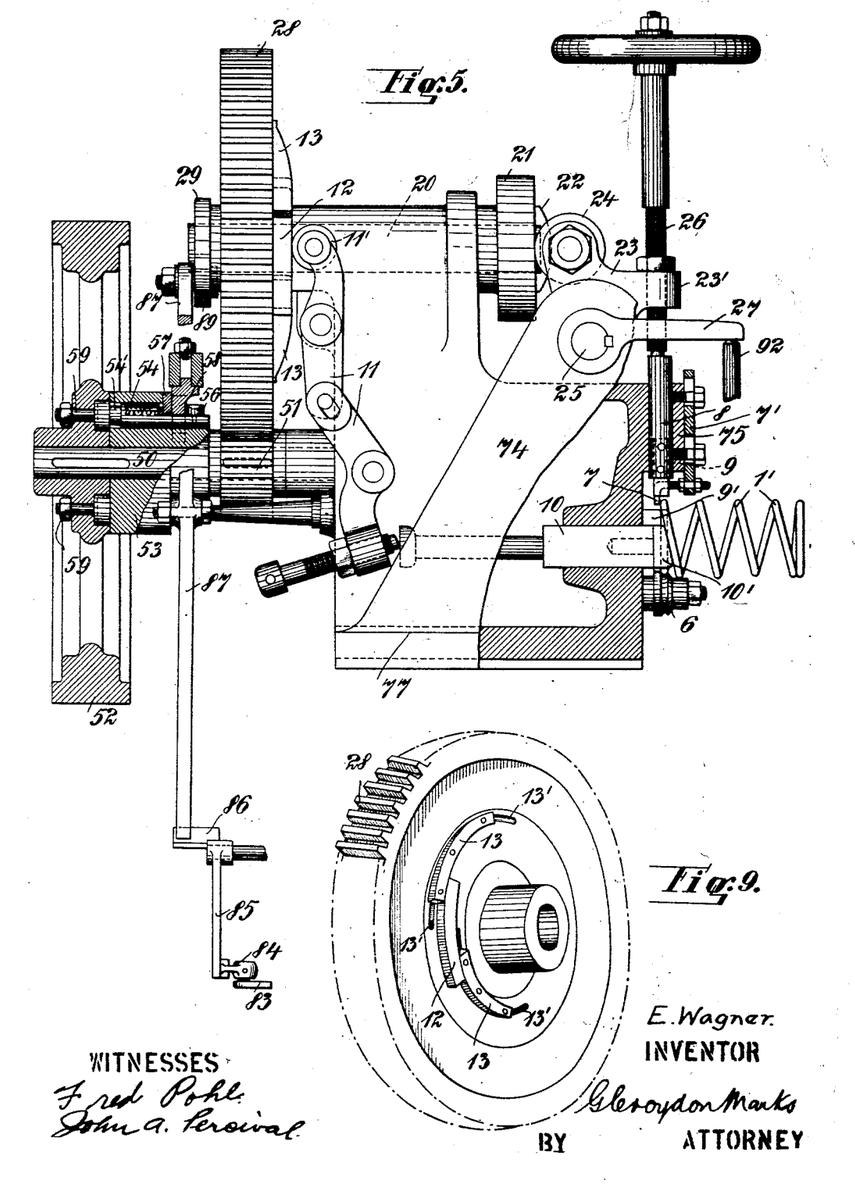
Fig. 5 shows the inner side of the apparatus according to Fig. 4 partly in section.
Figure 10:
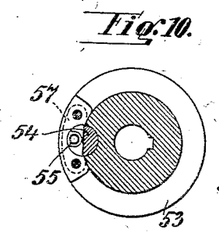
Figure 11:
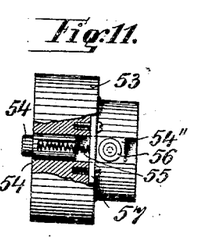
Figure 12:
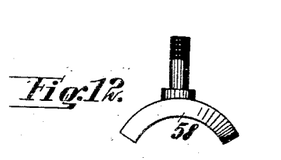
Figure 13:
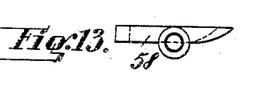

When in addition to the cutting apparatus described more fully hereinafter only the deflecting rolls 6, 6 and the finger 7 are in operation in the coiling apparatus (Figs. 4 and 5), the apparatus produces closed springs. Fig. 5 shows an adjustment of the coiling apparatus for making open springs (see 1'). For this purpose the slide 10, which is movably mounted in the direction of the axis of the spring to be coiled, is moved forward with its interchangeable head 10' toward the spring 1' in such a manner that the desired pitch is imparted to the spiral to be coiled owing to the wire, which is bent in circular form by the deflecting rolls, mounting the correspondingly inclined end surface of the head 10'. For the manufacture of closed springs the head 10' is removed from the slide 10, and the slide drawn back. Open springs (compression springs) should as a rule have a single closed turn or convolution at each end. In order to satisfy this requirement the slide 10 must be drawn back at the commencement of the coiling of the spring, then moved forward on the completion of a first turn of the spring, and then drawn back again at the beginning of the last turn but one. This movement of the pitch forming slide 10 is derived from the shaft 20 through the medium of two double levers 11, 11 and the guide cam 12, 13 13, provided on the toothed wheel 28. The shaft 20 also actuates by means of the cam 22 and bell crank lever 23, the cutting slide 8, and the gearing 28/51 of said shaft with the aid of an automatic controlling mechanism to be described below is alternately connected to and disconnected from the fly wheel 52 Fig. 5, which is continuously driven by means of a belt. The coupling device for this purpose is constructed as follows:—In the hub 53 (Figs. 5, 10 and 11) which is keyed by the side of the toothed wheel 51 on the shaft 50 there is mounted the coupling pin 54 at any one point of the periphery of said hub, said coupling pin being movable in the axial direction. The head 54' of this pin is adapted to enter under the action of a spring 55 the oppositely situated bored hole in any one of the bolts 59, which are fixed in the fly wheel hub. There may be any number of these bolts 59. The coupling bolt 54 is normally held in its drawn back position against the action of the spring 55 (Fig. 5) by the curved bar 58 (Figs. 12 and 13) which is sharpened at one end and carried by the lever 87 (see also Fig. 14). By means of this curved bar 58 the small roller 56 mounted on the flattened end 54" of the coupling bolt is held away from the small plate or disk 57. When the lever 87 can swing to the left (anti-clockwise in Fig. 4) under the action of the spring 88 after the projection 86 has moved out of its way (bottom of Fig. 4 and Fig. 14) at the beginning of the coiling of the last turn but one of the spiral 1', the roller 56 is released by the curved bar 58 and the coupling pin 54 can move to the position as shown in Fig. 11, whereby the coupling is thrown into engagement, whereupon the shaft 50 and therewith also the shaft 20 is caused to rotate. During the first part of the revolution of the shaft 20, the roller 11' (Fig. 5) which is carried by the upper of the two double levers 11, moves from the raised part of the cam 11, 12 and 13 on to the lower part of the same so that the pitch slide 10 can return into the inoperative position. When the shaft 20 has nearly completed half a revolution (clockwise, i. e. toward the right, Fig. 4) the cam 22 on the end of the shaft 20 acts on the roller 24 which is carried by the bell crank lever 23, whereby the cutting off device is operated. The spindle 26 which can be screwed into the eye 23' of the bell crank lever 23 presses down the rod 8 in the front part 75 of the frame 74, which rod is vertically adjustable and to which the upper shearing knife 9 is screwed, so that through the coöperation of the two shearing knives 9 and 9' the spiral is cut off.

The wire feed must be stopped during the cutting of the wire. For this purpose the axle of the upper feed roll 4 is mounted in a slide 41 (Fig. 2) which is adapted to move vertically in a suitable guide and on the upper surface of which slide rests a pressure rod 42. The pressure is produced by a system of levers constructed as follows:—The long arm 45 of the double lever 44, 45 (Figs. 1, 2 and 3) which is mounted in an eye 48 on the head plate 49 of the frame, carries a roller 46 which bears on the periphery of the cam 21 keyed on the shaft 20. The short arm 44 rests on the end of the lever 43 which is mounted between two eyes 47 of the head plate 49, the said lever 43 acting with a very short lever arm (Fig. 2) on the pressing rod 42. When the parts assume the position illustrated in the drawings, the upper feed roll 4, is thus pressed very powerfully against the lower roll 3. When, after the lever 87 has swung out, the shaft 20 has completed nearly a half of a revolution, the depressed or lower part of the cam 21 arrives under the roll 46 and the upper feed roll is thereby relieved from pressure until the completely coiled wire spiral has been completely severed. During the last quarter of the revolution of the shaft 20 the cam 13, 12 (Figs. 5 and 9) arrives under the roller 11' of the upper double lever 11, in such a manner that the new spiral, after the first turn or convolution of the same having been wound closed, is wound open as shown in Fig. 5.

Figure 6:
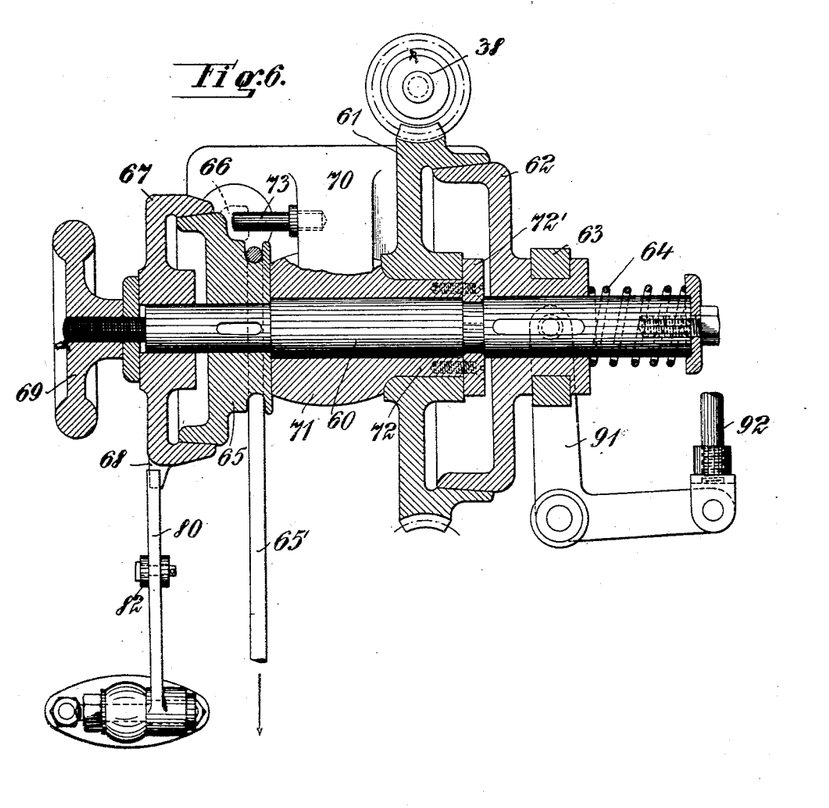
Figs. 6 and 7 are respectively a longitudinal section and end view also drawn to larger scale, of the device for regulating the number of convolutions of the springs to be made.
Figure 7:
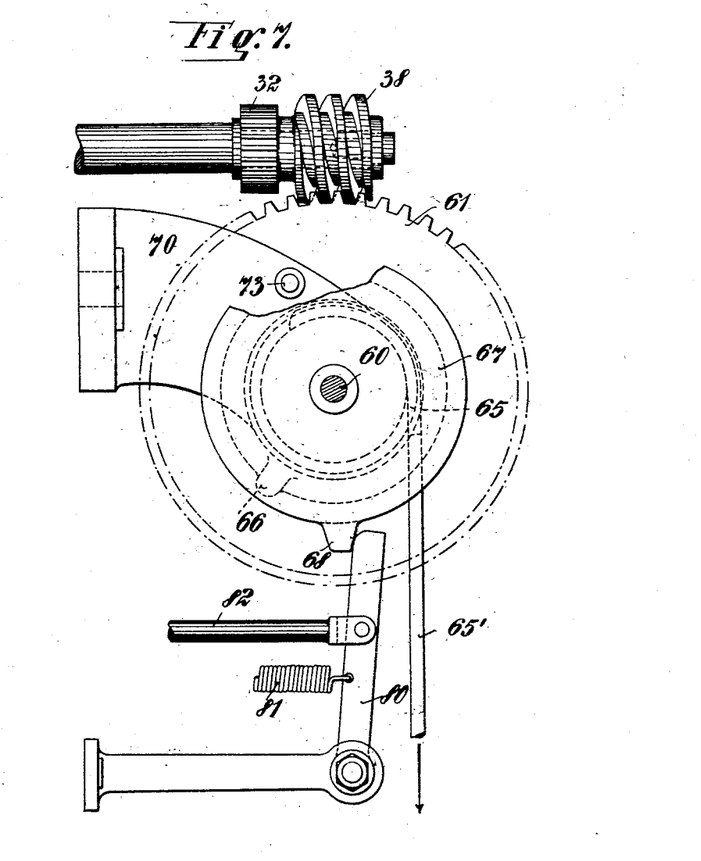
Figure 14:
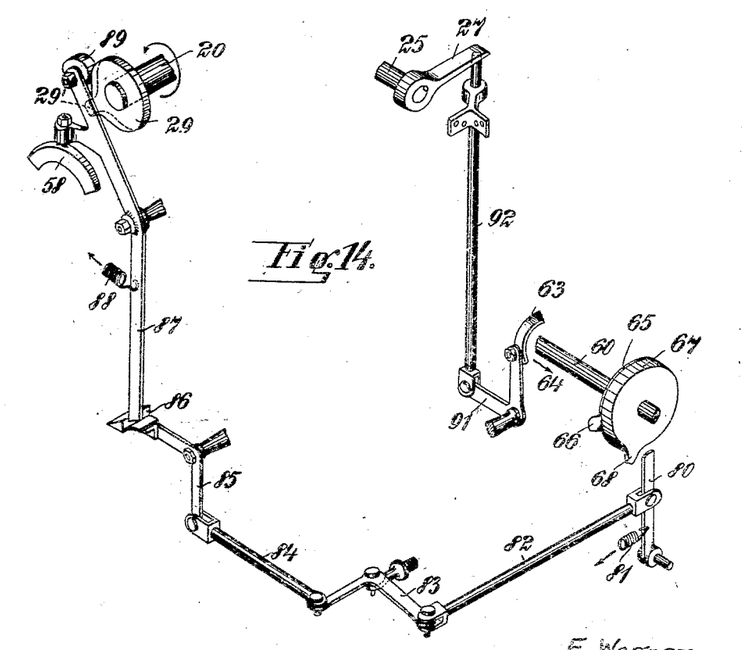

The controlling device shown in Fig. 14 and the regulating device shown in Figs. 6 and 7 are constructed as follows:—A worm 38 (Figs. 6 and 7) which, as already described above, is driven from the shaft of the lower feeding roll 3 by means of the toothed wheels 31 and 32, gears with a worm wheel 61 which is mounted loosely rotatable on the sleeve-like extension 72 of the eye 71 in the horizontal bracket 70, in the bore of which eye 71 the shaft 60 is mounted. The shaft 60 is protected from axial thrust by an annular divided ring or washer 72' screwed on to the part 72 and engaging in a neck groove of the shaft. The clutch disk 62 mounted so as to slide on the shaft 60 and rotating therewith is normally pressed by the spring 64 against the worm wheel so that the conical or concave conically turned flanges bear firmly against each other and consequently the disk 62, and therefore also the shaft 60 is carried around by the continuously rotating worm wheel 61. The hub of the disk 62 is embraced by a clip 63 to which the angle lever 91 is pivoted, by means of which latter the shaft 60 is uncoupled from the drive. On the other end of the shaft 60 there is keyed a rope pulley 65 which when the hand operated nut 69 is tightened up also drives the loose pulley 67 on the shaft through the coöperation of the cone shaped or hollow cone-shaped turned flanges. As the shaft 60 revolves a stop or tooth 68 mounted on the periphery of this pulley 67 strikes against the end of the lever 80 and rotates it in opposition to the action of the spring 81, consequently the connecting rod 82 which is pivoted to the lever rotates the bell crank lever 83 (Figs. 1, 2 and 14) which in its turn rocks the bell crank lever 85 by means of the rod 84 in such a manner, that the projection 86 releases the lever 87 which is under the action of the spring 88 and thereby couples the shaft 20 to its driving gear as above described. When the shaft 20 has made nearly half a revolution in the direction of the arrow (Fig. 14), the lever 27 which is keyed on the same pivot 25 as the bell crank lever 23 which operates the cutting off device, acts momentarily on the pressing rod 92, so that the bell crank lever 91 (Figs. 14 and 6) is turned against the action of the spring 64, whereby the shaft 60 is uncoupled from its driving gear. The shaft 60 (during the cutting off of the wire) then returns momentarily under the action of the weight 65′ (Figs. 2 and 6), until the stop 66 on the inner surface of the pulley 65 strikes against the bolt 73 screwed in the bracket 70. Simultaneously with the recommencement of the feeding of the wire by the rolls 3, and 4, 92 is again released by 27 and the coupling 61/62 closes again. At the commencement of the reverse rotation of the shaft 60, the lever mechanism 80, 82, 83, 84, 85, returns under the action of the spring 81 into the position shown in the drawings, so that the lever 87—after it has been swung, as described above, into the position illustrated in the drawings, through the action of the cam 29′ of the pulley 29 on the roller 89 of said lever and in which position the said lever holds the coupling 58—59 of the shaft 20 in the disengaged position by means of the bent bar 58—is again held fast in this position by the projection 86. In order to adjust the machine for a different number of convolutions of the springs to be manufactured, the nut 69 on the left hand end (Fig. 6) of the shaft 60 is unlocked and the disk 67 shifted relatively to the pulley 65 a corresponding amount. When the said disk is adjusted as illustrated in the drawings, the forward rotation of the shaft 60 extends over about a third of a revolution corresponding to about 17 revolutions of the rolls 3 and 4 which advance the wire and corresponding to about 38 turns of the spring manufactured in each working cycle.

In consequence of the transverse movability of the frame 74 of the coiling and cutting off apparatus, correspondingly large dimensions in the direction of the movement of the frame must be given to the roller 46 resting on the pulley 21, further to the lever 27 acting on the pressing rod 92, and also to the projection 86, which arrests the lever 87, so that these parts respectively coact in the requisite manner in every position of the frame.

In the example shown means are provided for enabling if desired a part of a turn or more than a turn of both ends of the compression spring to be wound close. These means consist in that the guide cam provided on the toothed wheel 28 which acts through the medium of the pair of bell crank levers 11, 11, upon the pitch-forming slide 10, is formed in three parts (Fig. 9). By shifting the two parts 13, 13 of the cam 13—12—13 toward each other the machine is adjusted for coiling closed less than one turn at both ends of the springs, and by shifting same away from each other, the machine is adjusted for coiling closed more than one turn. By replacing the cam 13—12—13 by a circular ring, the machine can be adapted for manufacturing open springs with open end convulutions; and by removing the pitch forming slide it is possible to wind close springs.

The following is a summary of the mode of operation of the machine: In the position of the parts illustrated in the drawings the shaft 20 is at rest; the upper feed roll 4 is pressed against the lower one 3, the pitch forming slide 10 is pushed forward and the shaft 60 revolves slowly forward until finally the stop 68 comes into contact with the lever 80. The lever mechanism 80—86, is then set in motion, the lever 87 is released, and in its turn releases the coupling 58—59. The latter is closed and the shaft 20 begins to revolve, consequently firstly the pitch-forming slide 10 can return into the inoperative position. When the shaft 20 has made nearly half a revolution the feed roll 4 is relieved from pressure, so that the wire feed stops and the cutting off device 8 and 9 is operated and simultaneously through the medium of the rod 92 the coupling 61/62 of the shaft 60, which has up till now continued to revolve slowly forward, is released for a short time, so that this shaft returns momentarily into its original position. At the same time the lever mechanism 80—86 moves back under the influence of the spring 81 into the ready position, whereas on the other hand the lever 87 remains for the time being in the swung out position. In consequence of the further rotation of the shaft 20 the upper feed roll 4 is again pressed against the lower one 3; toward the end of the revolution of the shaft 20 the pitch forming slide 10 is again moved forward and finally, by means of the projection 29' the lever 87 is again swung back, whereby the coupling 53—59 is again released so that the shaft 20 again stops. In consequence of the end of the lever 87 sliding over the projection 86 the lever mechanism is moved in opposition to the action of the spring 81; when the end of the lever has moved past the projection the lever mechanism moves back into its original position while the projection at the same time springs up.

Having now described my invention, what I claim as new and desire to secure by Letters Patent is:—

1. In a machine for manufacturing helical spiral springs, a main driving shaft, a pair of feed rollers actuated by the main driving shaft, a second shaft connected to a driving pulley by the intermediary of a one-revolution clutch, three cams on this shaft controlling a cutting device the wire feed and a pitch-forming member respectively, a regulating shaft driven by a constantly rotating shaft, a tooth adjustably mounted on the regulating shaft, and means actuated by said tooth for connecting the driving clutch of the second shaft.

2. In a machine for manufacturing helical spiral springs, a main driving shaft, a second shaft connected to a driving pulley by the intermediary of a one-revolution clutch, a regulating shaft driven by a constantly revolving shaft through the intermediary of a clutch, a tooth adjustably mounted on the regulating shaft, means actuated by said tooth for connecting the driving clutch of the second shaft, means actuated by a cam on the second shaft for holding disengaged the driving clutch of the regulating shaft during the time that the wire feed is inactive, and means for automatically returning the regulating shaft into its initial position, while its driving clutch is disengaged.

3. In a machine for manufacturing helical spiral springs, a main driving shaft, a second shaft connected to a driving pulley by the intermediary of a one-revolution clutch, two cams on the second shaft, by which, when the shaft has made half a revolution, the cutting device is actuated and the wire feed is rendered inactive, a third cam on the second shaft, by which the pitch-forming member is held in inoperative position nearly for the whole time of revolution of the shaft.

4. In a machine for manufacturing helical spiral springs, a main driving shaft, a second shaft, a cutting device, a wire feed, a pitch forming member, three cams on said second shaft respectively controlling the three last mentioned devices, the cam controlling the last device comprising three portions, the middle one of which is formed as a segment of a cylindrical ring and is solid on its shaft, while the two remaining portions are of slope form arranged to the side of the middle portion, are adjustable in the direction of rotation, their higher points adjacent the middle portion being of equal height with the latter.

In testimony whereof I affix my signature in presence of two witnesses.

ERNST WAGNER.

Witnesses:
ERNEST ENTENMANN,
FRIDA KLAIBER.